April 5, 1938.   B. LINN   2,112,917
AXLE GAUGE
Filed May 12, 1936    2 Sheets-Sheet 1
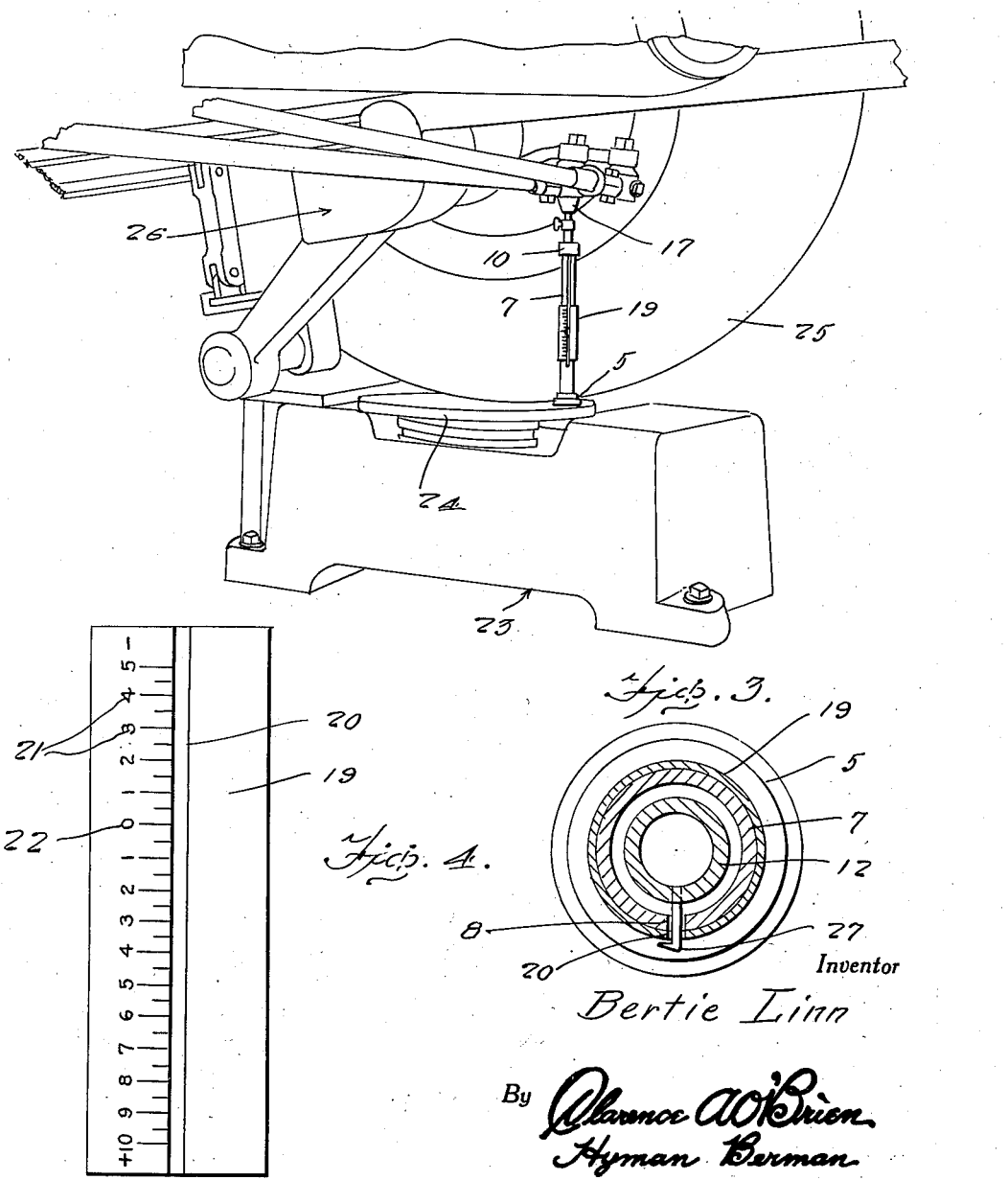

April 5, 1938.    B. LINN    2,112,917
AXLE GAUGE
Filed May 12, 1936    2 Sheets-Sheet 2
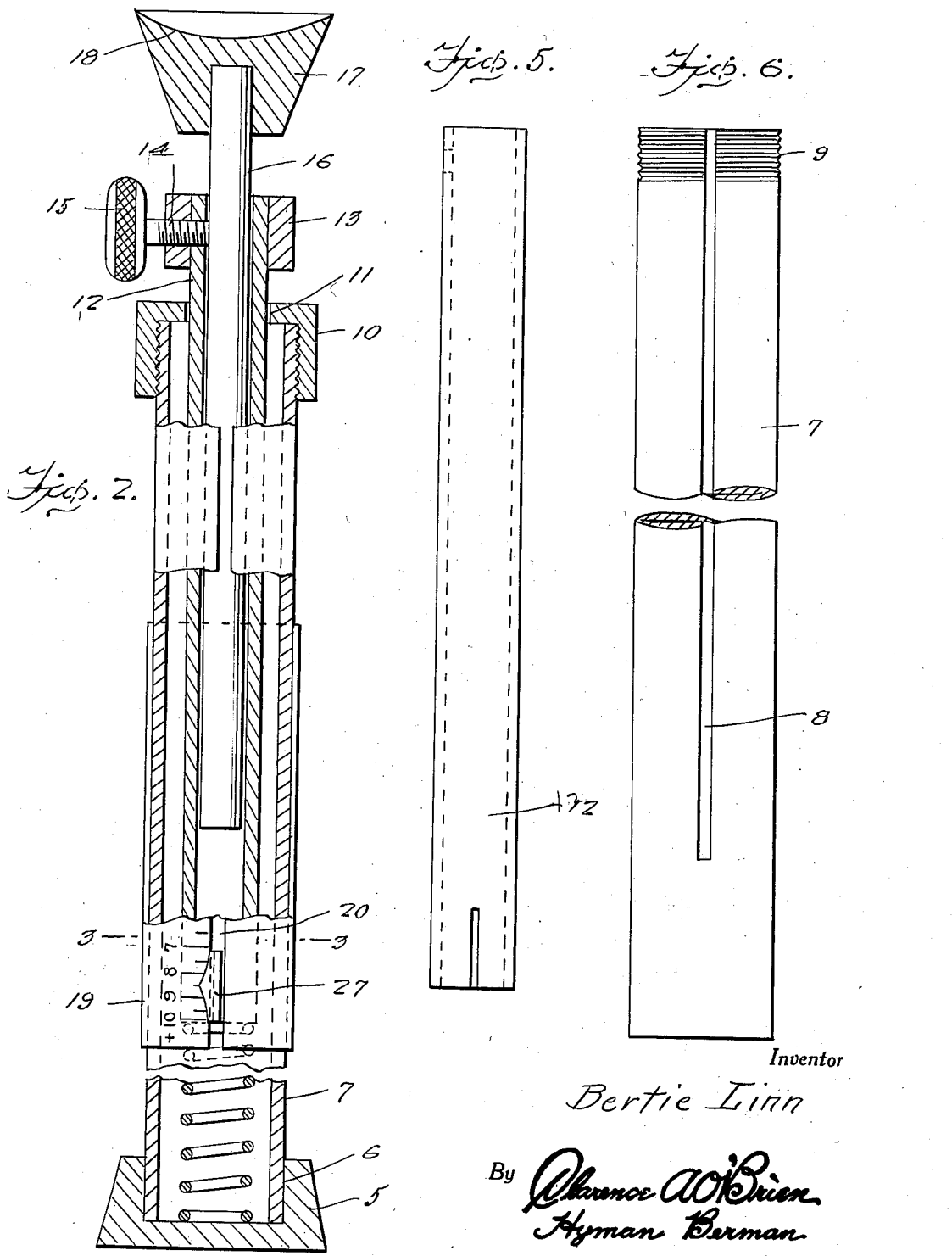
Inventor
Bertie Linn
By Clarence A. O'Brien
Hyman Berman
Attorneys Patented Apr. 5, 1938

2,112,917

UNITED STATES PATENT OFFICE 2,112,917

AXLE GAUGE

Bertie Linn, Taylorville, Ill.

Application May 12, 1936, Serial No. 79,373

3 Claims. (Cl. 33—143)

This invention appertains to new and useful improvements in gauges for measuring the caster of axles.

The principal object of the present invention is to provide a novel gauge structure which will be particularly adapted for use in conjunction with axle bending machines, to the end that the bending machine will not have to be removed from the axle to permit determination of whether the axle has been bent to the desired caster.

During the course of the following specification other important objects and advantages of the invention will become apparent to the reader.

In the drawings:—

Figure 1 represents a perspective view of the device in use, in conjunction with an axle bending machine.

Figure 2 is a side elevational view of the gauge with a substantial portion of the same in vertical section.

Figure 3 is a cross sectional view taken substantially on the line 3—3 of Figure 2.

Figure 4 is a side elevational view of the graduated sleeve.

Figure 5 is a side elevational view of the pointer carrying barrel.

Figure 6 is a fragmentary side elevational view of the tubular shell.

Referring to the drawings wherein like numerals designate like parts, it can be seen that the gauge consists of the base block 5 hollowed out as at 6 but snugly receiving the lower end of the elongated tubular shell 7, which as shown in Figure 6 is provided with a longitudinally extending slot 8. The upper end of this shell 7 is provided with threads 9 for disposition in the internally threaded cap 10 which has an opening 11 therein for slidably receiving the elongated barrel 12 which at its top has the collar 13 through which and itself the set screw 14 is feedable. This set screw 14 is provided with the knurled knob 15 and by feeding this screw 14 inwardly the same can bind against the elongated rod 16 which is vertically movable in the barrel 12. The upper end of the rod 16 is provided with the head 17 having the concavity 18.

Disposed around the lower portion of the shell 7 is the sheet metal sleeve 19 having the longitudinally extending slot 20 therein. On this sleeve 19 are graduations 21 extending from naught 22 upwardly and from naught downwardly indicating plus and minus caster. These graduations are situated adjacent the slot 20 in the sleeve 19.

The axle bending machine generally referred to by numeral 23 is provided with the usual turntable construction 24 upon which the wheel 25 of the vehicle is positioned. The axle bending irons denoted by numeral 26 are engaged with the axle. First check the caster of the axle and place the gauge under the spindle arm as shown in Figure 1. To prepare the device for operation, the rod 16 is properly set with respect to the barrel to take care of the wheel radius which is different on different makes of cars. The barrel is now forced downwardly against the tension of the spring on the base 5. The device is placed under the spindle arm, and the barrel 12 released, so that the head 17 will rise and engage the spindle arm. For example, if the caster is seven degrees and should be nine degrees, the gauge should be placed under the spindle arm several inches from the axle, and the pointer 27 at the seven degrees reading on the scale. The axle can now be bent until the pointer reaches 9 degrees on the axle. Should the caster be reversed, that is, should the caster be 9 degrees and 7 degrees is desired, all that is necessary is to set the pointer at the 9 degrees reading and bend the axle in the opposite direction until the pointer is opposite the 7 degrees reading. Some axles are set higher than others and to compensate for this in the use of the present gauge, the set screw 15 can be loosened and the rod 16 adjusted to the proper extent.

While the foregoing specification sets forth the invention in specific terms, it is to be understood that numerous changes in the shape, size and materials may be restorted to without departing from the spirit and scope of the invention as claimed hereinafter.

Having described the invention what is claimed as new is:—

1. A gauge for axle bending machines comprising a shell provided with a base, said shell having a barrel slidable therein and through the top thereof, said shell having a longitudinal slot therein, a pointer extending from the barrel through the slot, graduations on the outside of the shell, a vertically adjustable sleeve on the outside of the shell having a slot therein registering with the slot in the sleeve, and through which the pointer extends and on which the graduations are located.

2. A gauge for axle bending machines comprising a shell provided with a base, said shell having a barrel slidable therein and through the top thereof, said shell having a longitudinal slot therein, a pointer extending from the barrel through the slot, graduations on the outside of the shell, a vertically adjustable sleeve on the outside of the shell having a slot therein registering with the slot in the sleeve and through which the pointer extends and on which the graduations are located, and a rod slidable in the barrel and through the top thereof, and a detent on the barrel engaged with the rod.

3. A gauge for axle bending machines comprising a shell provided with a base, said shell having a barrel slidable therein and through the top thereof, said shell having a longitudinal slot therein, a pointer extending from the barrel through the slot, graduations on the outside of the shell, a vertically adjustable sleeve on the outside of the shell having a slot therein registering with the slot in the sleeve and through which the pointer extends and on which the graduations are located, a rod slidable in the barrel and through the top thereof, a detent on the barrel engaged with the rod, and a coiled compressible spring in the shell and interposed between the lower end of the barrel and the base.

BERTIE LINN.